United States Patent [19]

Haas et al.

[11] Patent Number: 5,058,088

[45] Date of Patent: Oct. 15, 1991

[54] TIME INDICATOR

[76] Inventors: Sandra F. Haas; David J. Haas, both of 9 Margret Ann La., Suffern, N.Y. 10901

[21] Appl. No.: 460,753

[22] Filed: Jan. 4, 1990

[51] Int. Cl.[5] ........................ G04B 17/00; G01N 31/32

[52] U.S. Cl. ........................................ 368/327; 116/200

[58] Field of Search .................. 368/327, 62, 114, 121; 116/200, 207, 217, 300

[56] References Cited

U.S. PATENT DOCUMENTS

| | | | |
|---|---|---|---|
| 3,018,611 | 1/1962 | Biritz | 58/1 |
| 3,480,402 | 11/1969 | Jackson | 23/254 |
| 3,520,124 | 7/1970 | Meyers | 58/1 |
| 3,954,011 | 5/1976 | Manske | 73/356 |
| 3,962,920 | 6/1976 | Manske | 73/356 |
| 4,028,876 | 6/1977 | Delatorre | 58/1 R |
| 4,212,153 | 7/1980 | Kydonieus et al. | 368/62 |
| 4,229,813 | 10/1980 | Liuy et al. | 368/89 |
| 4,382,700 | 5/1983 | Youngren | 368/327 |
| 4,408,557 | 10/1983 | Bradley et al. | 368/327 |
| 4,629,330 | 12/1986 | Nichols | 368/327 |
| 4,643,122 | 2/1987 | Seybold | 116/206 |
| 4,903,254 | 2/1990 | Haas | 368/327 |

*Primary Examiner*—Bernard Roskowski
*Attorney, Agent, or Firm*—Weingram & Zall

[57] ABSTRACT

A time indicator is provided which includes a first substrate having first and second surfaces and at least two indicia areas on the first surface. A second substrate having first and second surfaces is also provided. A first chemical agent is provided on each of the indicia areas and a second chemical agent is provided on the first surface of the second substrate. The first surfaces of each substrate overlay and are in contact with each other, the chemical agents coacting to cause a visually perceptible change at one of the second surfaces overlaying the first indicia area in a first selected time interval and a visually perceptible change in said second surface overlaying the second indicia area in a second selected time interval, the first selected time interval differing from the second selected time interval. A preferred embodiment of the time indicator includes an ink pattern of dots printed in a preselected pattern in the indicia area and an adhesive activator means on the first surface of the second substrate. The ink and activator coact to cause the ink pattern of dots to gradually bleed and blend together to cause a visually perceptible change through the second substrate overlaying the indicia area in a selected time interval.

Preferred embodiments of the invention are self-timing parking permits and tickets.

26 Claims, 4 Drawing Sheets

3

TIME INDICATOR

BACKGROUND OF THE INVENTION

1. Field of the Invention

This invention relates to a time indicator and, in particular, to a time indicator wherein the relative amount of time that has elapsed from the initial activation of the indicator can be rapidly and easily determined by the progression of a visually perceptible change in color along different areas of the indicator. This invention also relates to a novel means for adjusting selected time periods for an indicator.

2. Prior Art

Numerous devices are known which provide a visual indication of the passage of a pre-arranged amount of time. Such time indicators are useful, for example, when attached to perishable items for indicating the length of time the items have been on the wholesaler's or retailer's shelf. Thus, foods and other perishable items such as photographic materials can be provided with indicators which evidence a visual change, after being activated and the passage of a predetermined period of time. Time-temperature indicators are also known which indicate a visual change as a function of both time and temperature Virtually any time indicator however is also, at least to a minor extent, dependent upon temperature.

It is highly desirable to have time indicators on automobiles in parking lots. Parking permits are normally printed cards or tags on which a parking attendant writes the appropriate times and dates. The tags are difficult to see from a distance, are easily duplicated or counterfeited, and a close examination of each tag by the attendant is impractical. To date, Applicants do not know of any commercially available vehicle parking permit which uses a chemical or physical-chemical means to indicate the status of the permit. The time indicators known in the art are problematic if used as parking permits in that the temperature of the interior of the car can vary dramatically from day-to-day and any time indicator, for example designed for a selected expiration time at room temperature, will not function effectively under conditions of use in an automobile. For example, with high temperatures (e.g., summer) the time indicator will indicate expiration earlier than desired and for low temperatures (e.g., winter) the time indicator will indicate expiration later than desired.

Applicant is aware of the following prior art, none of which teach or suggest the claims of this invention.

U.S. Pat. No. 3,018,611 to Biritz describes a time indicator device which may be used for frozen foods, parking times, construction periods, etc. The device comprises a backing which is attachable to the outer surface of, for example, a package of frozen food. Superimposed on the backing is a strip of filter paper having a chemical reagent laminated thereto. The chemical reagent is an oxygen reactive material The strip is hermetically sealed by a covering of transparent, impervious pressure sensitive cellophane which allows visual inspection of the oxygen reactive layer. A pin-hole size opening is provided in the covering to allow for ingress of air within the interior of the container This opening is sealed by a removable tape. When the tape is removed the oxygen reactive material reacts to change color by permitting air to enter and diffuse into the container to make contact with the material. The pin-hole opening is provided at one end of the container and as time proceeds, the color proceeds toward the other unexposed end of the container.

U.S. Pat. No. 3,520,124 to Myers, describes a parked car time indicator which includes a first sheet having a first reactant and a second sheet having a second reactant, and a release sheet, which is peeled away to permit contact of the first sheet with the second sheet to start a reaction over a selective time interval terminating with a color change of the reactants.

U.S. Pat. No. 3,480,402 to Jackson, describes a time indicator formed of an absorbent carrier having absorbed thereon at least one chemical compound which changes color upon exposure to oxygen. The carrier and chemical compound absorbed thereon are protected from ambient oxygen by a non-perforated barrier layer which is transparent and through which atmospheric oxygen can controllably diffuse over a preselected period of time. Thus, when the chemical compound changes color, the preselected period of time is indicated. The graduated time indicator may be produced by utilizing more than one chemical or a layer covering the various pieces of absorbent material of different thickness. For each piece of absorbent material, the chemical absorbed on the piece of absorbent material would change color at different times, e.g., the chemical on one piece would change color after, say, one week, and the chemical absorbed on another piece would change color after ten days, and the chemical on a further piece of absorbent material would change color after fourteen days. Thus, a graduated time indicator is described.

U.S. Pat. Nos. 3,954,011 and 3,962,920 to Manske, describes a time indicating device suitable for visibly measuring parameters such as time, temperature and time-temperature relationships. The device includes a porous fluid-carrying pad, a wick material for said fluid and an indicator means whereby the progress of fluid along the wick material can be visibly indicated and used to measure the passage of time, the exposure to a given minimum temperature or time-temperature relationship.

U.S. Pat. No. 4,028,876 to Delatorre describes an apparatus for visually indicating elapsed time by a color change which comprises a transparent container having a rupturable capsule therein and in which a first composition is contained A transparent matrix surrounds the second composition which is also in the container. The device may be secured to a surface by means of a mechanical fastener or an adhesive layer.

U.S. Pat. No. 4,212,153 to Kydonieus, et al describes a laminated indicator which changes in a visually perceptible mode with the passage of time. The indicator comprises at least two layers whereby the molecular migration of an agent in an interior layer to the outermost surface of the exterior layer causes a change which is visually perceptible. This reference also describes the use of a step-wedge test color panel placed next to the indicator which is used to compare the developed color or shade. The step-wedge can be provided with indicia corresponding to the time period required to develop the color at each step of the wedge.

Attention is also drawn to U.S. Ser. No. 07/401,080 entitled "Time Indicator Enhancement Method", filed Aug. 31, 1989, and now U.S. Pat. No. 4,903,254, which is an improvement of the aforementioned Kydonieus, et al. patent, U.S. Pat. No. 4,212,153 in that it provides a time indicator badge which provides a clear indication of the expiration of time.

U.S. Pat. No. 4,229,813 to Lilly, et al describes a time indicator which utilizes a silicon oil which is slowly absorbed onto and moves up a porous strip at a rate which is a function of time. One side of the strip is printed with an oil soluble ink, while the other side is unprinted. The printed side of the strip is laminated with polyethylene film to an unprinted strip. As the silicon oil moves up the strip, the oil contacts the ink causing a dye in the ink to migrate from the printed side to the unprinted side, thus providing a measurable color front moving up the strip.

U.S. Pat. No. 4,382,700 to Youngren describes an indicator which contains a mineral jelly which is in contact with a wick, such that the mineral jelly diffuses into the paper in accordance with the changes in ambient temperature over a period of time.

U.S. Pat. No. 4,408,557 to Bradley, et al describes a timer comprising an absorptive layer disposed on a base layer which accepts a carrier mixture at a predetermined rate. A barrier means is disposed between the carrier mixture and the absorptive layer, and the removal of the barrier activates the timer.

U.S. Pat. No. 4,629,330 to Nichols describes a color change indicator which includes a liquid having a predetermined index of refraction and a rate of evaporation, a reservoir for holding liquid, and an opacifying layer of microporous material. The opacifying layer has an index of refraction approximately the same as that of a liquid and overlies the reservoir. The opacifying layer has an open cell network of pores for absorbing liquid from the reservoir and is in a first radiation scattering condition when the liquid occupies the opacifying layer, and in a second scattering condition when the liquid is depleted from the opacifying layer.

U.S. Pat. No. 4,643,122 to Seybold describes a diffusion controlled security tag comprising a carrier containing a solution of a compound which changes color upon diffusion or evaporation of the solvent. The carrier is enveloped in a barrier film which controls the rate of diffusion/evaporation of the solvent from the carrier, such that a change in color of the carrier indicates undesirable storage or product tampering.

One of the problems associated with all of the foregoing devices is that they are complicated to adjust for a selected period of time. This often involves experimentation with many types of inks, solvents, wicks, etc. to prepare a device which can operate under the conditions expected. Additionally, very few of these devices can indicate the relative length of time that has elapsed since the device was activated, i.e., it is difficult to determine what fraction of the selected period of time has elapsed. Most of the prior art devices gradually change color over a period of time and involve, at best, a guess on how much time has elapsed. When this is combined with the possible variations in temperature, humidity, etc. that may exist in the environment of the time indicator, the viewer has very little confidence that he is close to the expiration time of the device.

A need thus exists for a timer which is inexpensive and can clearly, relatively accurately and quickly indicate the lapse of progressive selected periods of time increments. Further, there is a need for a means for easily adjusting the selected period of time without the cumbersome trial and error methods used in the past.

OBJECTS AND SUMMARY OF THE INVENTION

It is an object of this invention to provide a time indicator device which can provide the user with a clear indication of the increments of time that have elapsed since activation of the device.

It is a further object of this invention to provide a time indicator device wherein the means for adjusting the selected period of time of the device ca be easily and simply adjusted.

It is still a further object of this invention to provide a self-expiring parking permit which enables a parking attendant to determine from a relatively long distance whether the parking permit has expired.

It is yet another object of this invention to provide a parking time indicator which can function inside a sealed vehicle which experiences large variations of temperature and can indicate the relative elapsed time.

It is still another object of this invention to provide a parking time indicator which is disposable, can be transferred from one vehicle to another and is relatively inexpensive.

It is a further object of this invention to provide a parking time indicator which can be customized for the particular needs of the parking lot, and wherein the possibility of duplication or counterfeiting is minimized.

The objects of this invention are achieved by a time indicator comprising:

a first substrate having first and second surfaces and at least two indicia areas on the first surface;

a second substrate having first and second surfaces;

a first chemical agent on each of the indicia areas;

a second chemical agent on the first surface of the second substrate;

wherein the first surfaces of each substrate overlay and are in contact with each other, the first and second chemical agents coacting to cause a visually perceptible change at one of the second surfaces overlaying the first indicia area in a first selected time interval and a visually perceptible change in said second surface overlaying the second indicia area in a second selected time interval, the first selected time interval differing from the second selected time interval.

Another embodiment of the time indicator of this invention comprises:

a first substrate having first and second surfaces and an indicia area on the first surface;

a second substrate having first and second surfaces;

an ink pattern of dots printed in a preselected pattern in the indicia area;

an activator means on the first surface of the second substrate;

wherein the first surface of each substrate are in contact and overlay each other, the ink and activator coacting to cause the ink pattern of dots to gradually bleed and blend together to cause a visually perceptible change through the second substrate overlaying the indicia area in a selected time interval.

In a highly preferred embodiment, the time indicator comprises:

a first substrate having first and second surfaces and at least two indicia areas on the first surface;

a second transparent substrate having first and second surfaces;

an ink pattern of dots printed in a preselected pattern in each of the indicia areas, wherein the pattern differs in each indicia area;

an adhesive activator means on the first surface of the transparent substrate;

wherein the first surface of each substrate overlay and are in adhesive contact with each other, the ink and adhesive activator coacting to adhesively bond the first substrate to the second transparent substrate and to dissolve the ink pattern of dots whereby the dots gradually bleed and blend together to cause a visually perceptible change through the transparent substrate overlaying the first indicia area in a first selected time interval and a visually perceptible change through the transparent substrate overlaying the second indicia area in a second selected time interval, the first selected time interval differing from the second selected time interval.

In its highly preferred form the time indicator is used as a parking time indicator, although there are numerous other applications such as self-timing, self-expiring, self-cancelling tickets, passes, badges, licenses and credentials.

DETAILED DESCRIPTION OF THE INVENTION

Figure 6:
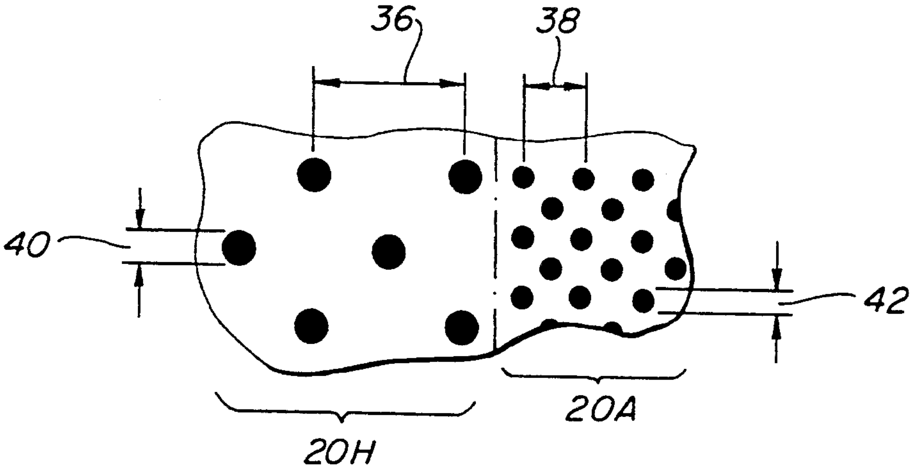
FIG. 6 is an enlarged detailed view of the time indicator of FIG. 1, showing the relationship, size and spacing of dots of the dot patterns.
Figure 7:
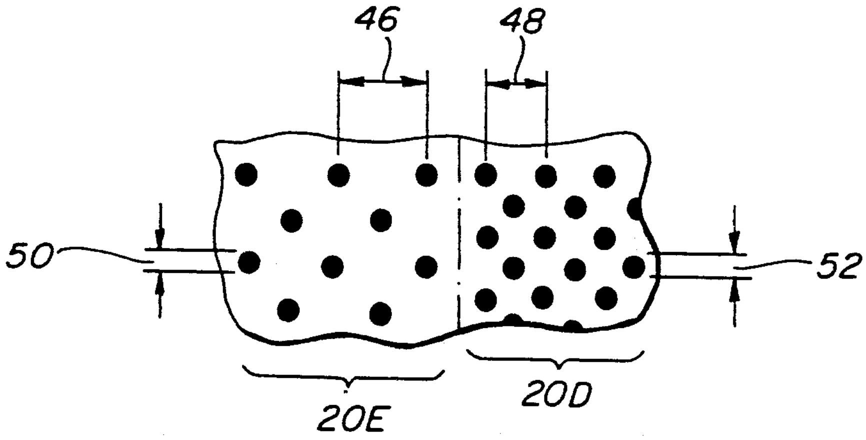
FIG. 7 is a view similar to FIG. 6, showing an alternate embodiment of the relationship, size and spacing of dots of the dot patterns.
Figure 8:
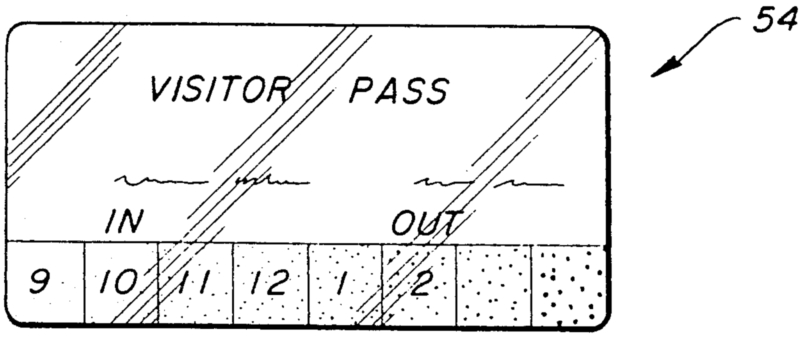
FIG. 8 is a front view of another embodiment of the time indicator of this invention.
Figure 9:
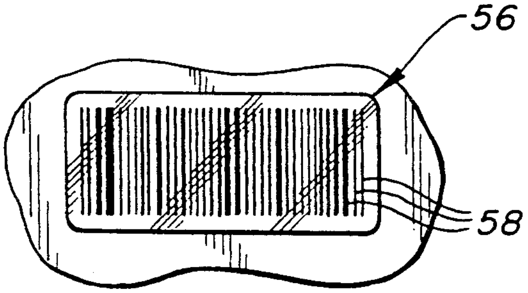
FIG. 9 is a fragmentary view of a bar code time indicator of this invention shortly after activation.
Figure 10:
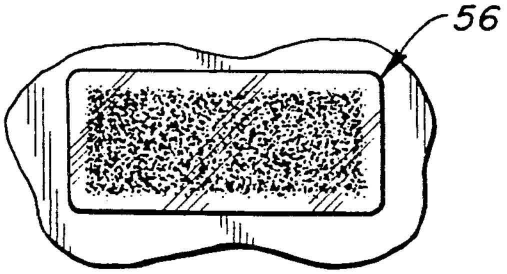
FIG. 10 is a fragmentary view of the bar code time indicator of FIG. 9 after expiration.

A highly preferred embodiment of this invention is depicted in FIGS. 1–7, with FIGS. 8, 9 and 10 depicting other embodiments of the invention.

Figure 1:
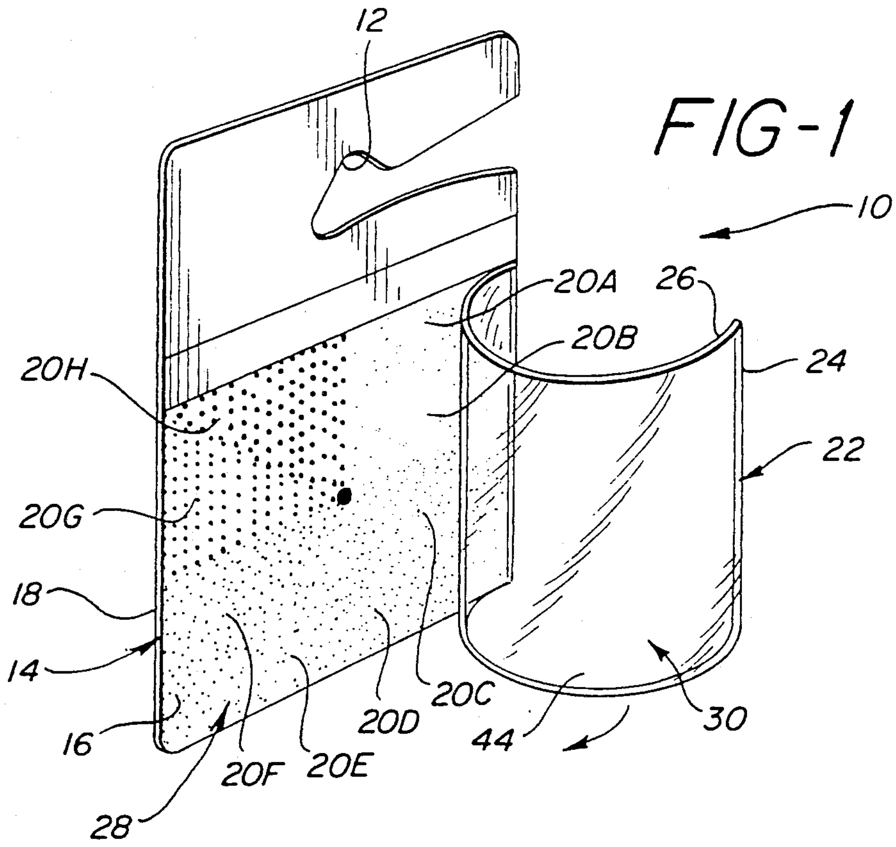
FIG. 1 is a perspective view of the parking time indicator of this invention being activated by applying a transparent substrate over the printed substrate.
Figure 2:
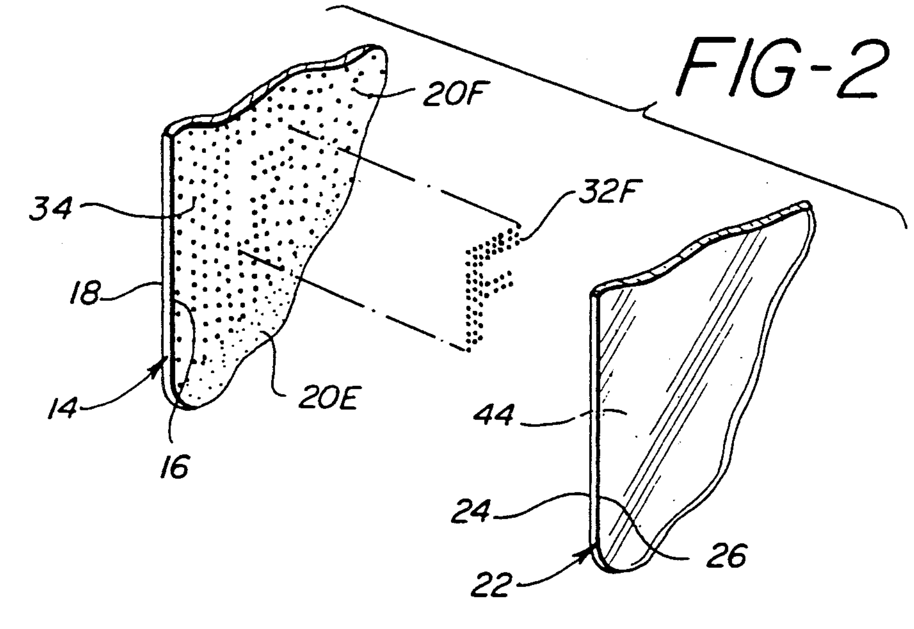
FIG. 2 is an exploded perspective view of a portion of the time indicator of FIG. 1 showing the first substrate, the dot pattern printing thereon, and the overlaying transparent substrate.
Figure 3:
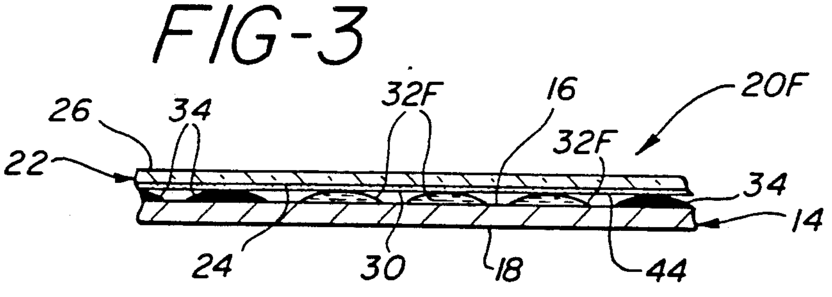
FIG. 3 is a schematic cross-sectional view of the time indicator of FIG. 1.
Figure 4:
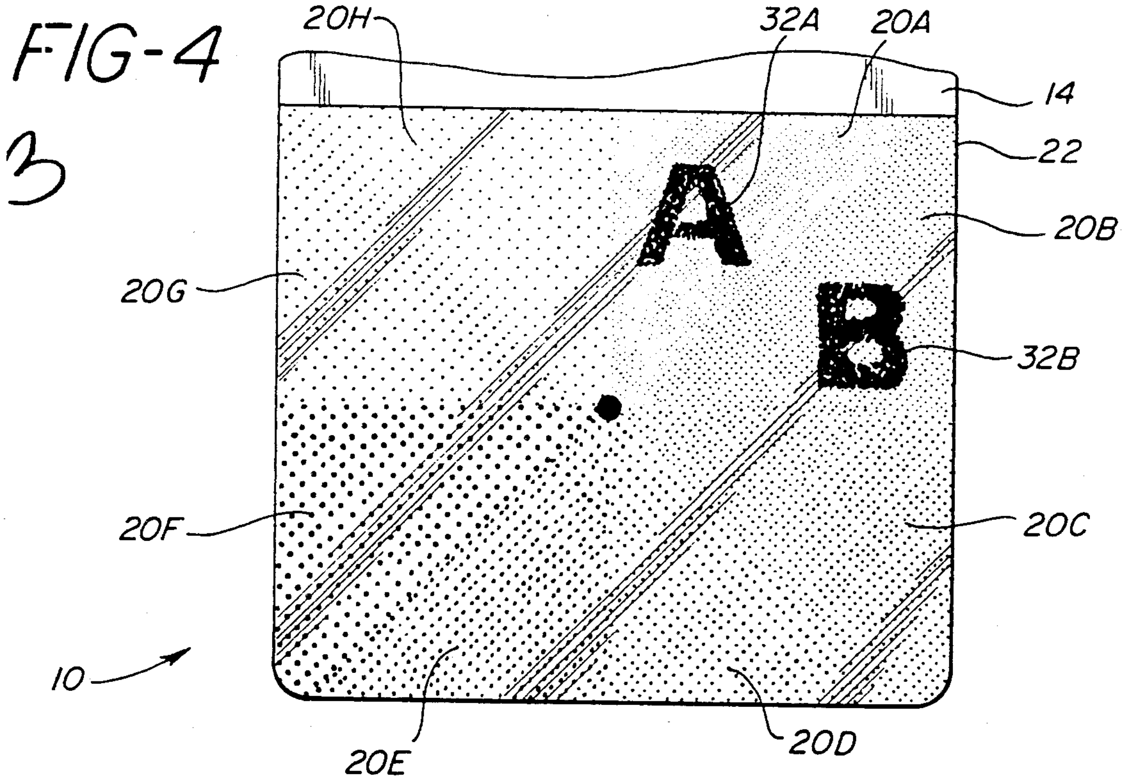
FIG. 4 is a partial front view of the time indicator of FIG. 1, shortly after activation.
Figure 5:
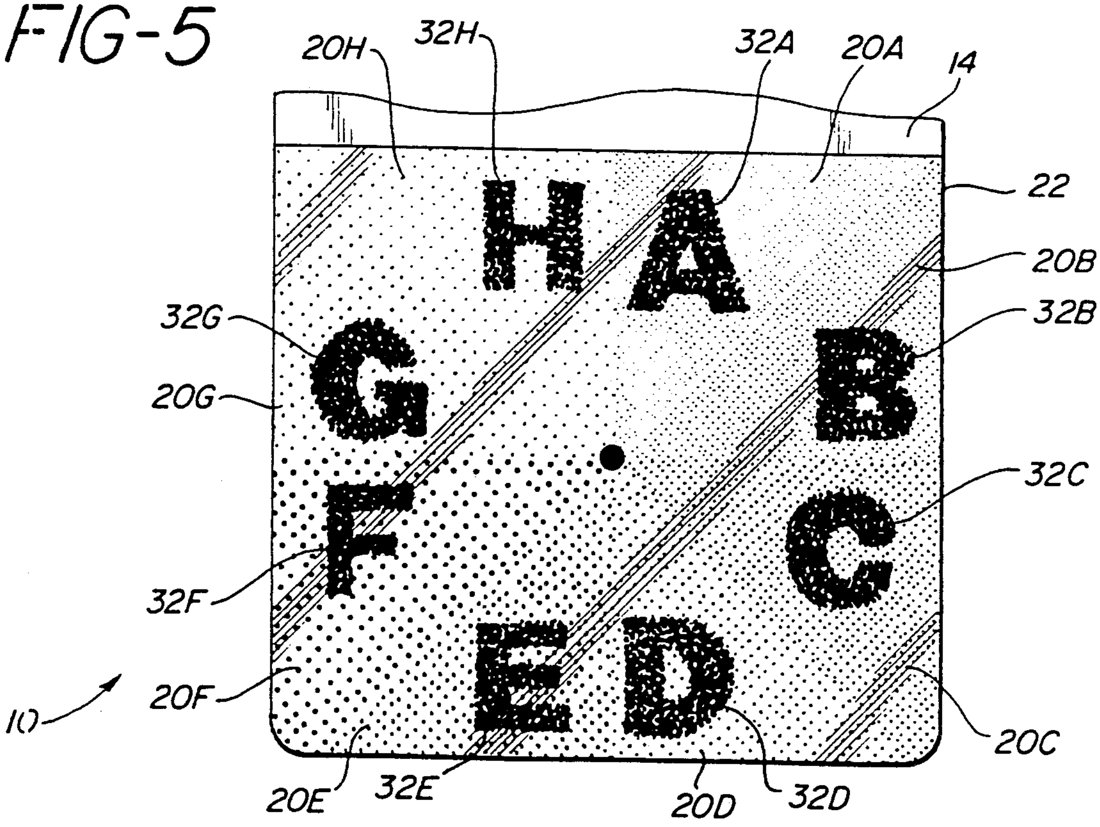
FIG. 5 is a partial front view of the time indicator of FIG. 4, after a longer period of time has elapsed.

A preferred embodiment of this invention is depicted in FIGS. 1–7 and comprises a rectangular parking permit or parking time indicator, generally designated 10, which may be conveniently hung from, for example, the rearview mirror of the car by slot 12 therein. Referring to FIGS. 1–3, the indicator 10 is comprised of a first substrate 14 which has first and second surfaces 16,18. Substrate 14 may be made of cardboard, plastic, or any other material suitable for its intended use. Substrate 14 has thereon at least two indicia areas on the first surface. This invention, however, contemplates any number of indicia areas. As shown in FIGS. 1, 4 and 5, the parking permit depicted has eight adjacent triangular indicia areas 20A–20H arranged in a clockwise pattern. Each indicia area is designed to indicate the passage of approximately an hour of time.

Still referring to FIGS. 1–3, a second substrate 22 is provided which has first and second surfaces 24,26. In general, a first chemical agent 28 is applied on each indicia area and a second chemical agent 30 is applied on the first surface 24 of the second substrate 22. When the first surfaces 16,24 of each substrate 14,22 overlay and are in contact with each other, the first and second chemical agents 28,30 coact to cause a visually perceptible change at one of the second surfaces 26 overlaying the first indicia area, e.g. 20A, in a first selected time interval, e.g. one hour, and a visually perceptible change in the second surface 26 overlaying the second indicia area 20B in a second selected time interval, e.g. two hours, the first selected time interval differing from the second selected time interval.

In the parking permit depicted in FIGS. 1–7, there are eight indicia areas 20A–20H. Each indicia area changes, sequentially, in a clockwise pattern, to depict the letters A, B, C, D, E, F, G and H, for example, an hour after the previous indicia area has depicted its respective letter. In effect the selected time interval for indicia 20A is one hour, 20B is two hours, 20C is three hours, etc.

In the preferred embodiments depicted herein the second substrate 22 is transparent. It should be understood however that the coaction of the agents 28,30 can, for example, produce a bleeding of color through the second substrate, thus obviating the need for transparent substrate.

Referring to FIGS. 1–7, an ink pattern is provided on each of the indicia areas 20A–20H. This ink pattern may be a pattern of dots 32A–32H printed in a preselected pattern in each of the indicia areas. The use of the term "dot" includes not only the usual meaning of the word dot, i.e., a small round point, but also other type small points of ink print, for example triangular, heart shaped, etc.

As indicated in FIG. 5, the ink pattern is an A, B, C, D, E, F, G and H, in FIG. 8 it is a number indicating time, e.g. 10,11, etc., and in FIG. 9 it is a series of bars producing a bar code.

As shown in FIG. 2 and FIG. 3, the indicia 20F may have an ink pattern 32F which is surrounded by a pattern of background dots 34, preferably of the same color as ink pattern 32F, which do not develop or change over a period of time. Ink pattern 32F is preferably a soluble ink pattern which, when placed in contact with the adhesive 44 which includes a solvent for the soluble ink, dissolves the dots so that the dots of the pattern bleed into each other. The background dots 34 are printed with an insoluble ink and thus they do not bleed together when in contact with the adhesive.

In general, it is the combination or coaction of the first and second chemical agents 28,30 that produces the indication of time and this may be accomplished by either varying the chemical agent and/or pattern on the second substrate 22 and/or on the first substrate 24. Thus, this invention also contemplates that the second chemical agent 30 on the second substrate 22 may be imprinted in such a manner that it dissolves only portions of the dot pattern imprinted o substrate 14.

An important aspect of this invention is that the use of a dot pattern imprinted on the first substrate makes it simple to vary the preselected time of development of each indicia area by varying the shape and size of the dots and/or varying the dot-to-dot linear dimension.

This variation of shape and size and dot-to-dot linear dimensions is seen in a macroscopic view in FIGS. 1, 4 and 5 and on a relatively microscopic view in FIGS. 6 and 7. For example, referring to FIG. 6, depicting indicia area 20A adjacent to indicia area 20H, the dots in 20A are smaller and spaced closer together than 20H, i.e., the dot-to-dot distance 36 is greater than 38 and the dot diameter 40 is greater than 42. Alternatively, as shown in FIG. 7, depicting adjacent areas 20E and 20D, the dot-to-dot distance 46 is greater than 48 and the dot diameters 50,52 are the same. Thus one can achieve varying preselected times by varying the geometric shape and size of the dots and/or the dot-to-dot distance. Depending on the application and times required, one can maintain the same geometric shape and size and vary the dot-to-dot distance of the patterns on indicia areas or keep the dot-to-dot linear distance the same and vary the geometric size and shape and/or vary both of these.

Referring to FIGS. 1-7, the indicia areas 20A-20H having dot patterns of different densities of colored migrating or soluble ink are printed on the permit in a clock face pattern. The dot "density" is most dense at the 12 to 1 o'clock indicia area 20A and progressively decreases in density in a clockwise manner.

In the preferred embodiment of the time indicator parking permit depicted in FIGS. 1-7, the first substrate 24 is made of cardboard or heavy paper which is cut to a shape that permits it to be hung from the rearview mirror of the vehicle, by, for example, slot 12. This type of attachment means insures that the permit is always in the same location in the vehicle independent of the type of vehicle and that the permit is not touching any surfaces, such as the windshield or the dashboard. The suspended permit experiences only ambient air temperature which is substantially cooler in summer and hotter in winter than the body or surface of the vehicle.

In use, the parking attendant issuing this parking permit 10 simply places the clear self-adhesive film 22 over the face of the printed substrate 14. This "activates" the indicator. As time passes, colored indicia develop, e.g. A, B, C, etc., beginning at, say 12 o'clock on the face and progress clockwise around the indicator as time progresses. A parking attendant can easily see which tags have expired and which are still valid simply by noting what most of the indicators show at the particular time he inspects the parking area.

Because the color change will be accelerated or suppressed depending on the ambient temperature, the parking attendant will use a relative comparison of all the tags in the area rather than any individual tag. This permits him to compensate for hot or cold days and thus use the same tag all year around. Of course, a transparent substrate having a different composition of adhesive and/or a different printed substrate may be used to compensate for temperature.

Depending on the rate of dissolution of the migrating ink by the adhesive on the cover film, the parking permits could be used for a few hours, a day, a week, etc. In each case the relative darkening of the indicator bands on the printed face of the parking tag would show the relative elapsed time since issuing the parking permit. The "clock" on the face of the permit can be seen from 10 to 20 feet away, darkened expired tags cannot be reused and it is difficult to print counterfeit permits.

Substrate 14 can be a continuous pin feed tag made of heavy paper stock, which may be computer-printed, written on directly by hand or left blank. To use, simply fill in the necessary information (expiration date, time, license number) and apply the clear activating cover 22 over the shaded clock. The clock will slowly become dark in stages showing expiration. Preferably there is a one-day and one-month activating cover. Such parking permits may be custom printed for use.

Based on the properties of the adhesive, dyes or inks and dot "density" used, the rate of color change or "dot growth" can be very accurately controlled. In all the embodiments depicted herein, all dots, i.e., the soluble and insoluble background dots, are printed with a black ink. Thus, anyone looking at the patterns cannot see the information contained in the soluble dotted array. This hidden or subliminal information is decoded, developed, or made visible by placing the second substrate over the dot pattern to cause the inks to behave differently. In this case the migrating ink begins to bleed into the adhesive on the rear surface of the film, causing the dots to grow. As each dot grows, it literally changes the dot density, hence making that portion of the printing darker and visible.

By using different dot patterns and dot densities, one can compensate for temperature variation so that different time-temperatures will show a progressive display pattern, while a specific time at only one temperature or within a limited temperature range will show a uniform and specific change with time only. Hence these can be true time indicators or time indicators which compensate for temperature variations or time temperature indicators.

Because of the bleeding of the dots below the second substrate there is no requirement that the ink pass through any optical barrier or opaque film. Additionally, there is no necessity for color change because the ink simply covers a larger area.

The initiation or activation of the ink migration may be by many means, for example, by heat, light, water, solvent, pressure, etc. Any stimulus that causes the color edges to spread or behave differently will produce visible information.

Preferred inks for use with this invention are from Gans Ink Company, Los Angeles, California. In particular, Pyroscript Sublimation Inks, e.g., Ink Nos. 57977, 57976, Heat Transfer Inks, Turn-A-Bout, Sunrise Process, Sunburst Process and Turn-A-Bout R.S. Series inks. Sublimation and heat transfer type inks are generally low molecular weight dyes that can bleed. Standard inks which do not bleed include particles, i.e., finely ground non-migrating solids (vis-a-vis molecules) which provide deep colors.

Almost any adhesive which is receptive to the dyes and inks can be used. By adding polar and/or non-polar materials to the adhesive you can alter the adsorption properties of the adhesive. Preferred adhesives are from Avery Company, Fasson Films Division, Painesville, Ohio.

The time indicator of this invention has many uses, including but not limited to:

a self-timing sticker for visual validation of electronic access cards;

a safety sticker that develops out warning words such as "Danger" after a specific time;

a one-day self-timing retail sticker that voids itself;

a time-temperature food spoilage indicator, a time indicator sticker for biological industrial processes, laboratory experiments, field testing, etc. where a clock or timer is impractical or too expensive;

a service sticker that shows words such as "Service Required" after a service or preventative maintenance time;

a property pass/luggage tab/bar coding sticker that self-expires to prevent reuse;

a tamper indicator inside/outside package that shows that the box was opened by mismatching printed array patterns;

a shipping sticker that changes color to flag urgent or dated shipments that are overdue or about to be missed;

a crime scene/frangible security seal that is tamper evident by varying printed patterns of different inks;

an I.D./admission bracelet that shows expired after one day so it does not matter if the bracelet or tag is removable;

a ski ticket/entertainment park pass that self-expires;

a toll book, bus/train pass, that develops out the words "Expired" after one week, one month, etc., to prevent loss of fares.

FIG. 8 shows an embodiment of the time indicator of this invention in the form of a visitor pass 54. After activation of the pass by applying the transparent substrate, the numbers 9, 10, 11, 12, etc. appear in sequence, indicating the hours elapsed since activation.

FIG. 9 and 10 show another embodiment of this invention in the form of a bar code 56, for example on a ticket. The bars 58 are imprinted, for example in a dot pattern and after activation by applying the transparent substrate gradually bleed together indicating a void bar code (FIG. 10).

All of the foregoing uses of the time indicator of this invention may be accomplished by merely varying certain attributes of the pass as broadly and specifically described herein.

We claim:

1. A time indicator comprising:

a first substrate having first and second surfaces and at least two indicia areas on the first surface;

a second substrate having first and second surfaces;

a first chemical agent on each of the indicia areas;

a second chemical agent on the first surface of the second substrate;

wherein the first surfaces of each substrate overlay and are in contact with each other, the first and second chemical agents coacting to cause a visually perceptible change at one of the second surfaces overlaying the first indicia area in a first selected time interval and a visually perceptible change in said second surface overlaying the second indicia area in a second selected time interval, the first selected time interval differing from the second selected time interval.

2. A time indicator comprising:

a first substrate having first and second surfaces and at least two indicia areas on the first surface;

a second substantially transparent substrate having first and second surfaces;

an ink pattern on each of the indicia areas;

an ink dissolver on the first surface of the second substrate;

wherein the first surfaces of each substrate overlay and are in adhesive contact with each other, the ink and ink dissolver coacting to cause a migration of the ink causing a visually perceptible change through the transparent substrate overlaying the first indicia in a first selected time interval and a visually perceptible change through the transparent substrate overlaying the second indicia in a second selected time interval, the first selected time interval differing from the second selected time interval.

3. A time indicator comprising:

a first substrate having first and second surfaces and at least two indicia areas on the first surface;

a second transparent substrate having first and second surfaces;

an ink pattern of dots printed in a preselected pattern in each of the indicia areas, wherein the pattern differs in each indicia area;

an adhesive activator means on the first surface of the transparent substrate;

wherein, when the first surface of each substrate overlay and are in adhesive contact with each other, the ink and adhesive activator coact to adhesively bond the first substrate to the second transparent substrate and to dissolve the ink pattern of dots whereby the dots gradually bleed and blend together along the surface of the first substrate to cause a change visually perceptible through the transparent substrate overlaying the first indicia area in a first selected time interval and a change visually perceptible through the transparent substrate overlaying the second indicia area in a second selected time interval, the first time interval differing from the second time interval.

4. The time indicator of claim 3, wherein each ink pattern has a substantially uniform distribution of dots with a predetermined dot-to-dot distance.

5. The time indicator of claim 4, wherein all the dots of at least two patterns of dots are substantially the same geometric shape and size.

6. The time indicator of claim 5, wherein the dot-to-dot distance of the at least two ink patterns differ.

7. The time indicator of claim 4, wherein the respective dot-to-dot distance of each of the indicia areas is substantially the same and each respective pattern has dots of differing geometric shape or size.

8. A time indicator comprising:

a first substrate having first and second surfaces and an indicia area on the first surface;

a second substrate having first and second surfaces;

an ink pattern of dots printed in a preselected pattern in the indicia area;

an activator means on the first surface of the second substrate;

wherein, when the first surface of each substrate are in contact and overlay each other, the ink and activator coact to cause the ink pattern of dots to gradually bleed and blend together along the surface of the first substrate to cause a change visually perceptible through the second substrate overlaying the indicia area in a selected time interval.

9. The time indicator of claim 8, wherein the ink pattern has a substantially uniform distribution of dots with a predetermined dot-to-dot distance.

10. The time indicator of claim 9, wherein each individual dot of a respective pattern of dots is the same geometric shape and size.

11. A time indicator comprising:

a first substrate having first and second surfaces and an indicia area on the first surface;

a second transparent substrate having first and second surfaces;

an ink pattern of dots printed in a preselected pattern in the indicia area;

an adhesive activator means on the first surface of the transparent substrate;

wherein, when the first surface of each substrate are in adhesive contact and overlay each other, the ink and adhesive activator coact to adhesively bond the first substrate to the second transparent substrate and to dissolve the ink pattern of dots whereby they gradually bleed and blend together along the surface of the first substrate to cause a change visually perceptible through the transparent substrate overlaying the indicia area in a selected time interval.

12. The time indicator of claim 11, wherein the ink pattern has a substantially uniform distribution of dots with a predetermined dot-to-dot distance.

13. The time indicator of claim 12, wherein each individual dot of the pattern of dots is substantially the same geometric shape and size.

14. A substrate for a time indicator comprising first and second surfaces and at least two indicia areas on the first surface; and a soluble ink pattern of dots printed in a preselected pattern in each of the indicia areas, wherein the pattern differs in each indicia area.

15. The substrate of claim 14, wherein each ink pattern has a substantially uniform distribution of dots with a predetermined dot-to-dot distance.

16. The substrate of claim 15, wherein all the individual dots of at least two patterns of dots is substantially the same geometric shape and size.

17. The substrate of claim 16, wherein the dot-to-dot distance of the at least two ink patterns differ.

18. The substrate of claim 15, wherein the respective dot-to-dot distance of at least two of the indicia areas remains substantially constant and each respective pattern on the at least two indicia areas has dots of differing geometric shape or size.

19. A substrate for a time indicator comprising first and second surfaces and an indicia area on the first surface; and a soluble ink pattern of dots printed in a preselected pattern in the indicia area.

20. The substrate of claim 19, wherein the ink pattern has a substantially uniform distribution of dots with a predetermined dot-to-dot distance.

21. The substrate of claim 19, wherein each individual dot of the pattern of dots is substantially the same geometric shape and size.

22. A time indicator comprising:

a first substrate having first and second surfaces and a plurality of indicia areas on the first surface arranged in a clockwise pattern;

a second transparent substrate having first and second surfaces;

an ink pattern of dots printed in a preselected pattern in each of the indicia areas, wherein the pattern differs in each indicia area;

an adhesive activator means on the first surface of the transparent substrate;

wherein, when the first surface of each substrate overlay and are in adhesive contact with each other, the ink and adhesive activator coact to adhesively bond the first substrate to the second transparent substrate and to dissolve the ink pattern of dots whereby the dots gradually bleed and blend together along the surface of the first substrate to cause a change visually perceptible through the transparent substrate overlaying the indicia areas in a plurality of selected time intervals, the selected time intervals for each indicia area increasing in a clockwise pattern.

23. The time indicator of claim 22, wherein each ink pattern has a substantially uniform distribution of dots with a predetermined dot-to-dot distance.

24. The time indicator of claim 23, wherein all the dots of at least two patterns of dots are substantially the same geometric shape and size.

25. The time indicator of claim 24, wherein the dot-to-dot distance of the at least two ink patterns differ.

26. The time indicator of claim 23, wherein the respective dot-to-dot distance of at least two of the indicia areas is substantially the same and each respective pattern has dots of differing geometric shape or size.

* * * * *